United States Patent
Fujiwara et al.

[11] Patent Number: 5,920,139
[45] Date of Patent: Jul. 6, 1999

[54] MAGNET MOTOR STATOR

[75] Inventors: Masakatsu Fujiwara; Masaru Tanaka; Tatsuki Tanaka; Toshihiro Suhara; Toshihiro Matsumoto; Hiroaki Sagara; Yoshihiko Maeda, all of Osaka, Japan

[73] Assignee: Sanyo Electric Co. Ltd., Osaka, Japan

[21] Appl. No.: 08/820,719

[22] Filed: Mar. 18, 1997

[51] Int. Cl.⁶ .............................. H02K 1/17; H02K 21/14
[52] U.S. Cl. ........................ 310/154; 310/216; 310/254; 310/67 A
[58] Field of Search ................................. 310/216, 154, 310/218, 67 A, 254

[56] References Cited

U.S. PATENT DOCUMENTS

| | | | |
|---|---|---|---|
| 2,298,652 | 10/1942 | Schwartzmann et al. | 310/154 |
| 2,692,345 | 10/1954 | Wahlberg | 310/154 |
| 3,010,041 | 11/1961 | Miller | 310/194 |
| 3,671,787 | 6/1972 | Herron | 310/154 |
| 4,150,312 | 4/1979 | Armstrong et al. | 310/42 |
| 4,516,046 | 5/1985 | Mercier | 310/154 |
| 4,559,463 | 12/1985 | Kobayashi | 310/156 |
| 4,845,837 | 7/1989 | Lloyd | 310/42 |
| 4,982,125 | 1/1991 | Shirakawa | 310/88 |
| 5,506,557 | 4/1996 | Sakaguchi et al. | 335/302 |
| 5,510,662 | 4/1996 | Tanimoto et al. | 310/156 |

FOREIGN PATENT DOCUMENTS

| | | | |
|---|---|---|---|
| 58-136981 | 9/1983 | Japan | H02K 23/04 |
| 63-143036 | 9/1988 | Japan | H02K 1/17 |
| 5-336687 | 12/1993 | Japan | H02K 1/17 |

Primary Examiner—Nestor Ramirez
Assistant Examiner—Burton Mullins
Attorney, Agent, or Firm—Smith, Gambrell & Russell; Beveridge, DeGrandi, Weilacher & Young Intellectual Property Group

[57] ABSTRACT

A magnet motor stator where a magnet of a pole of a stator includes multiple magnets. Each magnet can be flat and made from rare-earth materials. It is thus possible to manufacture these magnet motor stators at a lower cost accompanied by a reduction in size and weight for the magnet motor.

21 Claims, 19 Drawing Sheets

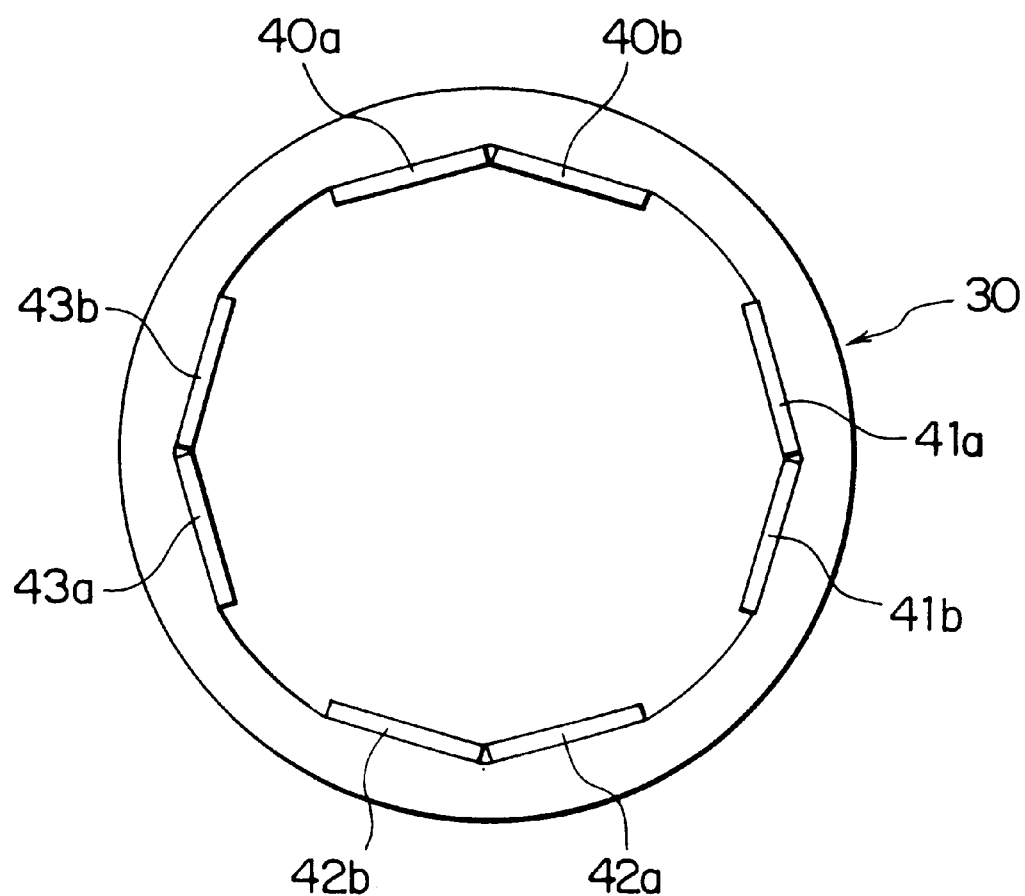

MAGNET MOTOR STATOR

BACKGROUND OF THE INVENTION

1. Field of the Invention

The present invention relates to a magnet motor stator, and more particularly, it relates to a magnet motor stator suitable for use in an electric bicycle also known as a motor-assisted bicycle, in which human power is assisted by the driving force of a motor.

2. Description of Related Art

Recent attention has focused on an electric bicycle which is provided with a manpower driving section based on human power and a motor driving section based on an electric motor; the motor is driven partly by the driving force of human power, and the human driving force is supplemented with motor driving force.

As disclosed in Japanese Unexamined Patent Publication No. H04-358987 (B62M 23/02), there is the conventional electric bicycle in which a manpower driving system and a motor driving system are provided in parallel, and the motor output is controlled by detecting the driving force of the manpower driving system.

In this construction, however, the driving section is far from the rear wheel, so that there is a considerable loss of force as the driving force is transmitted to the rear wheel. In order to transmit the force to the rear wheel, it is necessary to convert the longitudinal rotation of the pedal and the motor into rotation in a direction transverse to the driving shaft. It is further necessary to convert into rotation in the longitudinal direction for the rotation of the rear wheel. These inconveniences result in such problems as a complicated construction, a tendency toward a larger size and the easy occurrence of additional problems. To solve these problems, the present inventors have provided a type of electric bicycle in which a motor causes direct rotation of the rear wheel.

Now, an embodiment of the electric bicycle of the rear wheel direct driving type will be described below with reference to the drawings.

FIG. 16 is a whole perspective view of an electric bicycle of the rear wheel direct driving type, in which 1 is the body of the electric bicycle. The electric bicycle body 1 is provided with a motor 8 described later. The driving force of the motor 8 is adjusted in response to the extent of torque provided by human power to ensure travel by supplementing the human force by the force of the motor 8.

A front wheel 2, a rear wheel 3, a handle 13 and a saddle 21 are attached to a frame 4 of the electric bicycle body 1, and the front wheel 2 is steered by means of the handle 13. A disk-shaped casing 5 is provided at the rotation shaft portion of the rear wheel 3.

The disk-shaped casing 5 has a rotating side casing 6 and a fixed side casing 7 fixed to the electric bicycle body 1, and the rotation side casing 6 rotates integrally with the rear wheel 3.

The motor 8 is built in the disk-shaped casing 5. The motor 8 is driven when motor driving is required to cause rotation of the rotation side casing 6 together with a manpower driving section 10 described later. A motor driving section 9 is the driving section provided with this disk-shaped casing 5.

The manpower driving section 10 has pedals 11 and a chain 12. The rear wheel 3 is rotated through the chain 12 when the user steps on the pedals 11. While the chain 12 serves as a transmitting member of human power in this embodiment, the transmitting member is not limited to this, but the chain 12 may be replaced by a belt, a rotation shaft or the like.

Brake levers 14 and 15 are attached to both horizontal ends of the handle 13 for steering the front wheel 2. Braking units 18 and 19 are provided on the front wheel 2 and the rear wheel 3, respectively. The brake levers 14 and 15 and the braking units 18 and 19 are connected by wires 16 and 17.

By pulling the brake levers 14 and 15, the wires 16 and 17 are pulled, causing operation of the front and the rear braking units 18 and 19. A braking switch 20 is provided in the middle of the wires 16 and 17, forming a mechanism for disconnecting the electric power supply to the motor when operating the brake levers 14 and 15.

A battery section 22 serving as a power source for the motor 8 is attached to the frame 4 on the rear wheel 3. The battery section 22 comprises a battery case 23 that is attached to the frame 4 and can be released by sliding, and a single type chargeable cell housed in this battery case 23, the supply voltage of which is about 24 V.

Now, the foregoing disk-shaped casing 5 will be described below with reference to FIGS. 17 and 18.

FIG. 17 is a front view illustrating the construction of the disk-shaped casing 5 shown in FIG. 16, in which 7 is the fixed side casing fixed to the electric bicycle body.

In the fixed side casing 7, there is a control board, a control section (not shown) comprising a radiator plate, the motor 8, a reduction mechanism 26 comprising three pulley groups consisting of a first pulley transmitting the output of an output shaft 24 of the motor 8, a pulley set 25 of a second pulley, and a final stage pulley 28, and a transmission belt 27 for connecting the individual pulley and the final stage pulley 28.

The final stage pulley 28 is fixed to the rotation side casing 6. When the motor 8 rotates, all the components from the output shaft 24 of the motor 8 to the final stage pulley 28 rotate by the action of the transmission belt 27, are speed-reduced, and the rotation side casing 6 rotates, together with the final stage pulley 28.

A unidirectional clutch (not shown) intervenes in the smaller pulley of the second pulley to be connected to the final stage pulley 28 so that, when a force is applied to the pedals, the motor 8 does not rotate, so that the pedals become lighter. In the drawing, 29 is an axle of the rear wheel.

FIG. 18 is a front view illustrating the arrangement of the motor 8 in the foregoing disk-shaped casing 5: 30 is a stator, 40 is a magnet and 60 is a rotor.

As shown in FIG. 19, an insulating plate 61 for insulating the rotor 60 of the motor 8 and a coil is integral with a cooling fan 62.

The motor driving section 9 having this disk-shaped casing 5 is considerably large in size as well as in weight, and it is necessary to reduce the weight and size for application to bicycles. To reduce the weight and size, the driving motor needs to be downsized.

SUMMARY OF THE INVENTION

To downsize a motor having a permanent magnet as a field system, it is effective to use a magnet having a large BH-product to provide a large magnetic flux. Known magnets having a large BH-product include rare-earth magnets such as a neodymium magnet comprising neodymium, iron and boron, and a samarium-cobalt magnet.

For example, the neodymium magnet has a BH-product of 30 MGOe, which is about ten times as high as that of a ferrite magnet, but is very expensive at a cost of about 30 times as high. A neodymium magnet is therefore used in the field system of a rotor of a brushless motor.

One option, therefore, is to adopt a brushless motor using a rare-earth magnet such as a neodymium magnet with a view to downsizing the motor. However, this is not desirable because of the complicated circuit configuration and high cost.

It is more useful to adopt a magnet motor that is a DC motor having a simple circuit configuration and a mechanical brush, while attempting to reduce size by using a powerful rare-earth magnet such as a neodymium magnet as a stator.

The present invention has an object to provide a magnet motor stator of small size and weight, that can be manufactured at a low cost and having improved motor properties.

BRIEF DESCRIPTION OF THE DRAWINGS

FIG. 1 is a configuration diagram of the magnet motor stator claimed in claim 1 of the present invention;

DETAILED DESCRIPTION OF THE PREFERRED EMBODIMENTS

Now, the present invention will be described below by means of embodiments with reference to the drawings.

FIG. 1 is a configuration diagram of the magnet motor stator of the present invention. In FIG. 1, 30 is a magnet motor stator formed by laminating steel sheets (silicon steel sheets), 40a and 40b are flat magnets made of a rare-earth substance such as neodymium magnets, two neodymium magnets forming a single magnetic pole, and similarly, 41a, 41b, 42a, 42b, 43a and 43b form another three magnetic poles, representing in this case a four-pole stator.

The neodymium magnets are made into a flat shape and are attached to the inner surface of the stator with an adhesive. In place of this neodymium magnet, a samarium-cobalt magnet, which is another rare-earth magnet, may be used.

Because the magnet has a very simple flat shape, manufacture thereof is simpler than that of the conventional arcuate magnet, thus reducing the manufacturing cost of the magnet, and hence achieving a lower-cost stator.

As the neodymium magnet has a large BH property, a smaller size magnet is sufficient to produce the same magnetic force, thus permitting the use of a smaller stator diameter, and hence making it possible to downsize the stator.

Figure 2A:
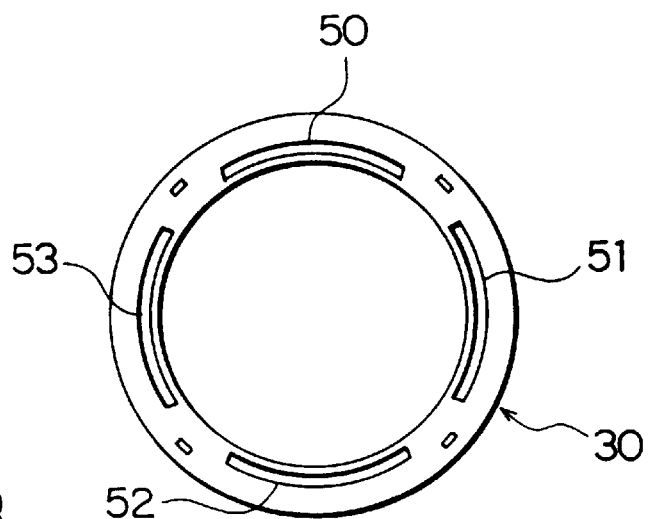
FIG. 2 is a configuration diagram of the magnet motor stator claimed in claim 2 of the present invention.
Figure 2B:
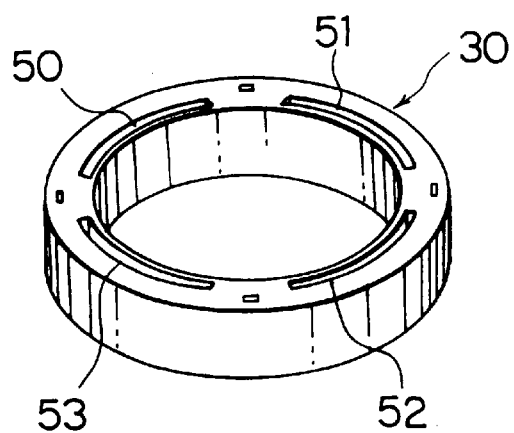
Figure 2C:
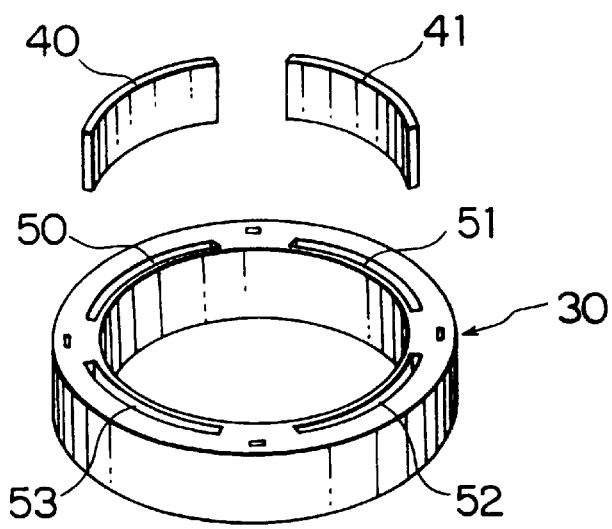

FIG. 2 is a configuration diagram of another magnet motor stator of the present invention. FIG. 2A is a front view of the magnet motor stator; FIG. 2B is a perspective view of the same; and FIG. 2C is a relational diagram between the magnet insertion hole of the stator and the magnet.

In FIG. 2, 30 is a magnet motor stator formed by laminating steel sheets (silicon steel sheets); 50, 51, 52 and 53 are magnet insertion holes formed in the stator 30; and 40 and 41 are arcuate magnets which are of the ferromagnetic type made of a rare-earth substance such as neodymium magnet, a single magnet forming a magnetic pole. Similarly, two other magnetic poles (not shown) form a four-pole stator in this embodiment. This magnet is made of a rare-earth substance, and may be a samarium-cobalt magnet.

The magnet motor stator 30 is formed by providing magnet insertion holes 50, 51, 52 and 53 in the stator, and inserting and holding the magnets 40 and 41 in these insertion holes.

This eliminates the necessity of the positioning operation of the magnets upon attaching the magnets to the stator and the bonding operation with an adhesive, and improves the assembly property. Elimination of the need for an adhesive reduces the cost, permitting manufacture of the stator at a lower cost.

Figure 3A:
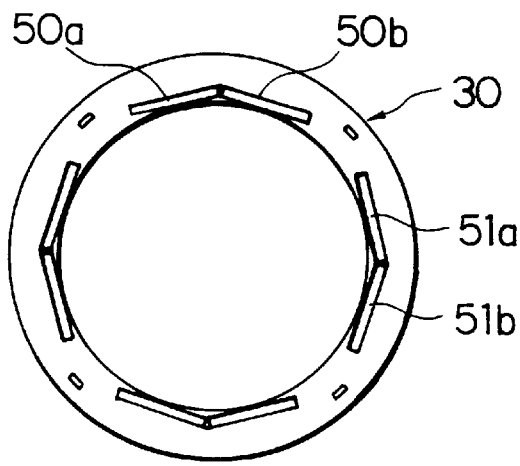
FIG. 3 is a configuration diagram of the magnet motor stator claimed in claim 3 of the present invention.
Figure 3B:
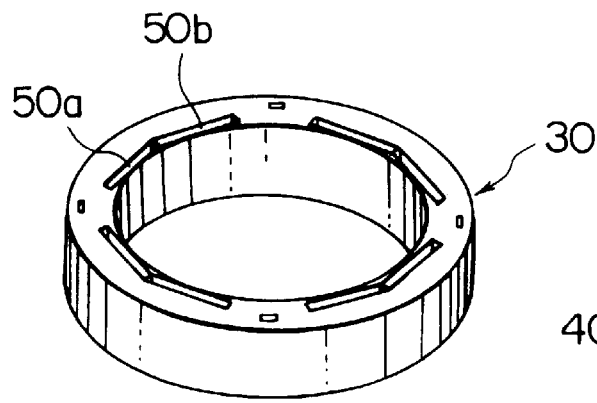
Figure 3C:
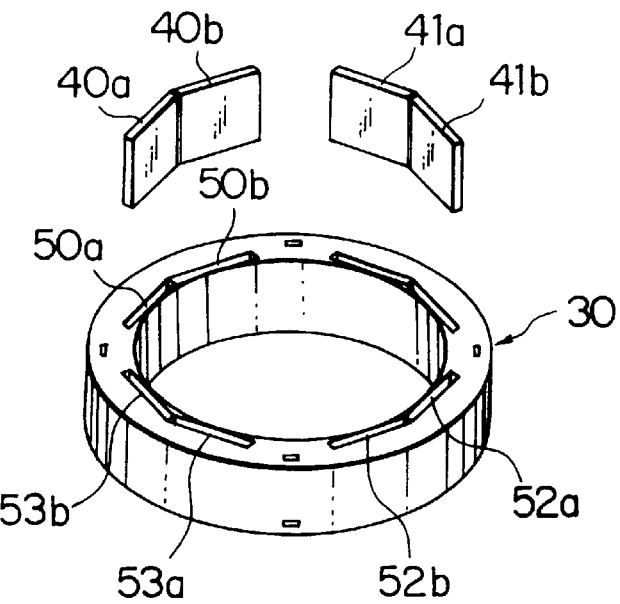

FIG. 3 is a configuration diagram of another magnet motor stator of the present invention. FIG. 3A is a front view of the magnet motor stator; FIG. 3B is a perspective view of the same; and FIG. 3C is a relational diagram between the magnet insertion hole of the stator and the magnet.

In FIG. 3, 30 is a magnet motor stator formed by laminating steel sheets (silicon steel sheets); and 50a, 50b, 51a, 51b, 52a, 52b, 53a and 53b are magnet insertion holes formed in the stator 30.

Also in FIG. 3, 40a and 40b are flat magnets which are of the ferromagnetic type made of a rare-earth substance such as a neodymium magnet or a samarium-cobalt magnet, two magnets forming a magnetic pole. Similarly, magnets and 41b form another magnetic pole, and represent a four-pole stator in this embodiment.

The magnet motor stator 30 is formed by providing magnet insertion holes 50a, 50b, 51a, 51b, 52a, 52b, 53a and 53b in the stator, and inserting and holding the flat magnets 40a, 40b, 41a, 41b, 42a, 42b, 43a and 43b (some reference numerals omitted) in these insertion holes.

Because the magnet is made into a flat shape, a very simple shape, it is easier to prepare than the conventional arcuate magnet, thus reducing the manufacturing cost of the magnet.

This eliminates the necessity of the positioning operation of the magnets upon attaching the magnets to the stator and the bonding operation with an adhesive, and improves the assembly property. Elimination of the need for an adhesive reduces the cost, permitting manufacture of the stator at a lower cost.

Figure 4:
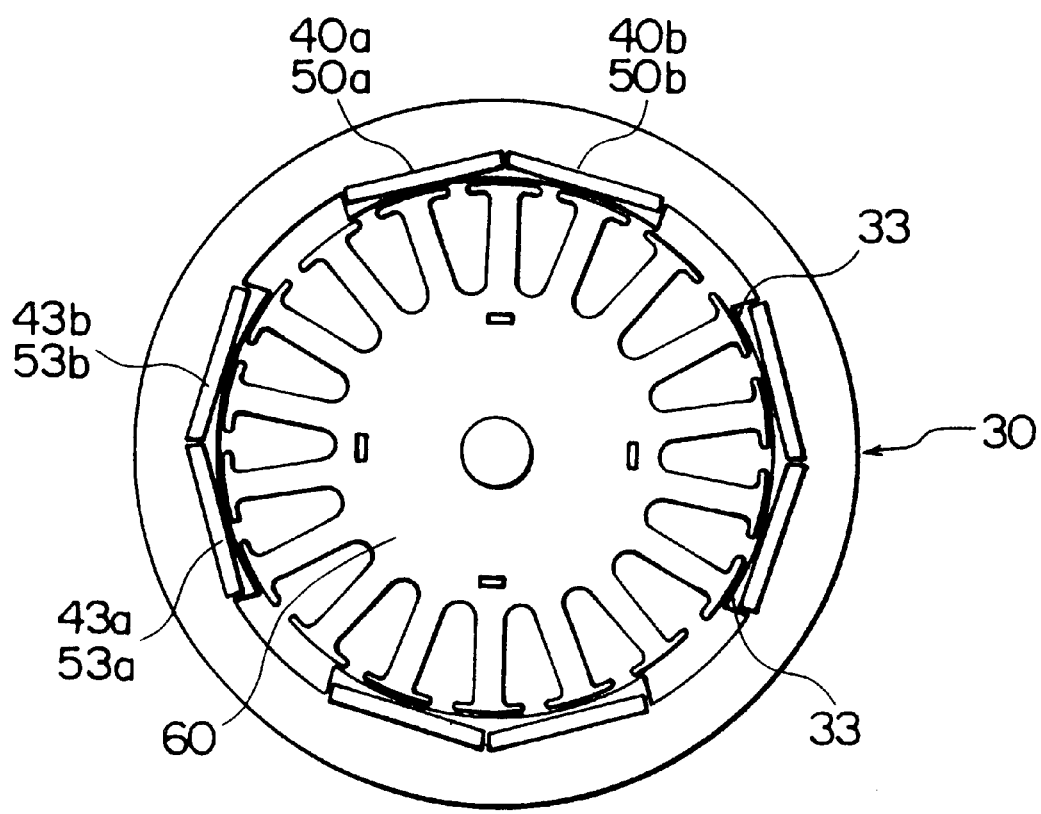
FIG. 4 is a configuration diagram of the magnet motor stator claimed in claim 4 of the present invention.

FIG. 4 is a front view of another magnet motor stator of the present invention. In FIG. 4, 30 is a magnet motor stator formed by laminating steel sheets (silicon steel sheets); and 50a, 50b, 51a, 51b, 52a, 52b, 53a and 53b (some reference numerals omitted) are magnet insertion holes formed in the stator 30.

Also in FIG. 4, 40a and 40b are flat magnets which are of the ferromagnetic type made of a rare-earth substance such as a neodymium magnet or a samarium-cobalt magnet, two magnets forming a magnetic pole. Similarly, magnets 41a, 41b, 42a, 42b, 43a and 43b (some reference numerals omitted) form another three magnetic poles, and represent a four-pole stator in this embodiment.

This embodiment of the present invention is characterized in that the portion of the magnet insertion hole facing the magnet on the bore side of the magnet motor stator 30 is formed into an arcuate shape. More specifically, to ensure a small and uniform air gap, the portion 33 facing the rotor 60 of the magnet insertion hole portion is formed into an arcuate shape corresponding to the shape of the rotor.

The magnet motor stator is formed by providing the magnet insertion holes 50a, 50b, 51a, 51b, 52a, 52b, 53a and 53b (some reference numerals omitted) in the stator, and inserting and holding the flat magnets 40a, 40b, 41a, 41b, 42a, 42b, 43a and 43b (some reference numerals omitted) into these insertion holes.

By forming the portion 33 of the magnet insertion hole facing the magnet on the bore side of the magnet motor stator 30 into an arcuate shape, it is possible to reduce leakage of magnetic flux and thus improve the properties of the motor.

Because the magnet is made into a flat shape, a very simple shape, it is easier to prepare than the conventional arcuate magnet, thus reducing the manufacturing cost of the magnet.

Furthermore, this eliminates the necessity of the positioning operation of the magnets upon attaching the magnets to the stator and the bonding operation with an adhesive, and improves the assembly property. Elimination of the need for an adhesive reduces the cost, permitting manufacture of the stator at a lower cost.

Figure 5:
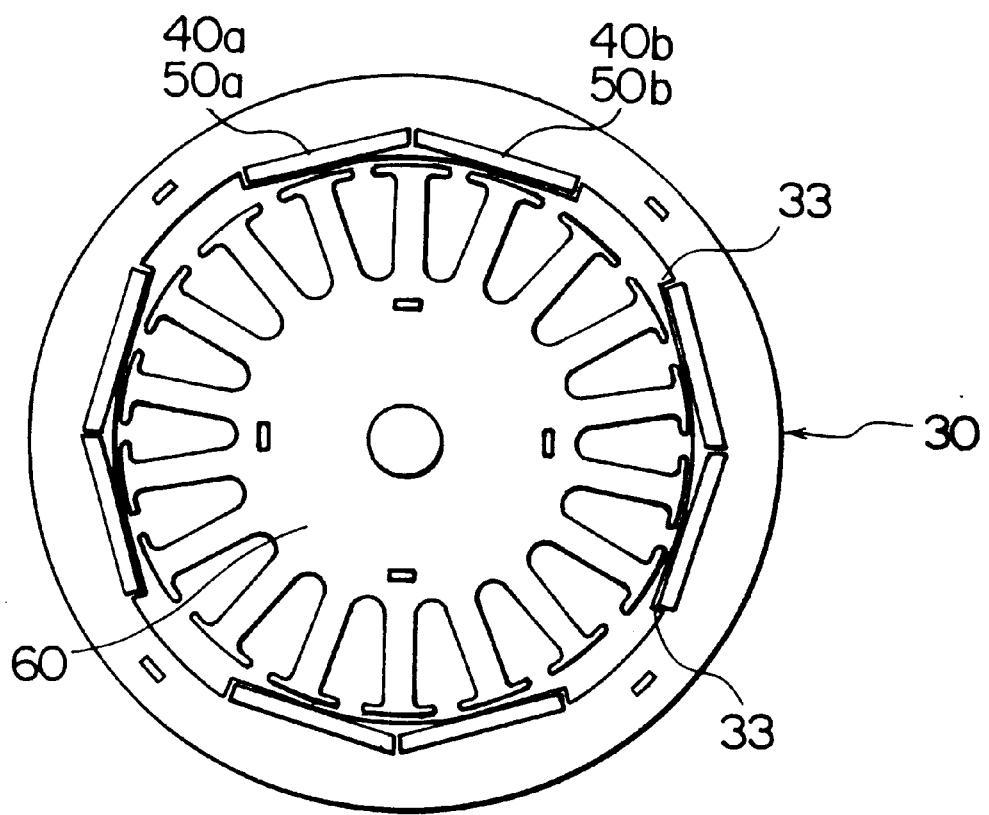
FIG. 5 is a configuration diagram of the magnet motor stator claimed in claim 5 of the present invention.

FIG. 5 is a front view of another magnet motor stator of the present invention. In FIG. 5, 30 is a magnet motor stator formed by laminating steel sheets (silicon steel sheets); and 50a, 50b, 51a, 51b, 52a, 52b, 53a and 53b (some reference numerals omitted) are magnet insertion holes formed in the stator 30.

Also in FIG. 5, 40a and 40b are flat magnets which are of the ferromagnetic type made of a rare-earth substance such as a neodymium magnet or a samarium-cobalt magnet, two magnets forming a magnetic pole. Similarly, magnets 41a, 41b, 42a, 42b, 43a and 43b (some reference numerals omitted) form another three magnetic poles, and a four-pole stator is formed in this embodiment.

This embodiment of the present invention is characterized in that the portion 33 of the magnet insertion hole facing the magnet on the bore side of the magnet motor stator 30 is formed in a direction in which the air gap with the rotor 60 becomes wider.

The magnet motor stator is formed by providing the magnet insertion holes 50a, 50b, 51a, 51b, 52a, 52b, 53a and 53b (some reference numerals omitted) in the stator, and inserting and holding the flat magnets 40a, 40b, 41a, 41b, 42a, 42b, 43a and 43b (some reference numerals omitted) into these insertion holes.

By forming the portion 33 of the magnet insertion hole facing the magnet on the bore side of the magnet motor stator 30 in a direction in which the air gap with the rotor 60 becomes wide, it is possible to reduce the magnetic flux at the magnet insertion hole ends, and by increasing magnetic flux at the magnetic center, it is possible to achieve a slow curve magnetic flux distribution with a sine wave shape and improve the properties of the motor.

Because the magnet is made into a flat shape, a very simple shape, it is easier to prepare than the conventional arcuate magnet, thus reducing the manufacturing cost of the magnet.

Furthermore, this eliminates the necessity of the positioning operation of the magnets upon attaching the magnets to the stator and the bonding operation with an adhesive, and improves the assembly property. Elimination of the need for an adhesive reduces the cost, permitting manufacture of the stator at a lower cost.

Figure 6:
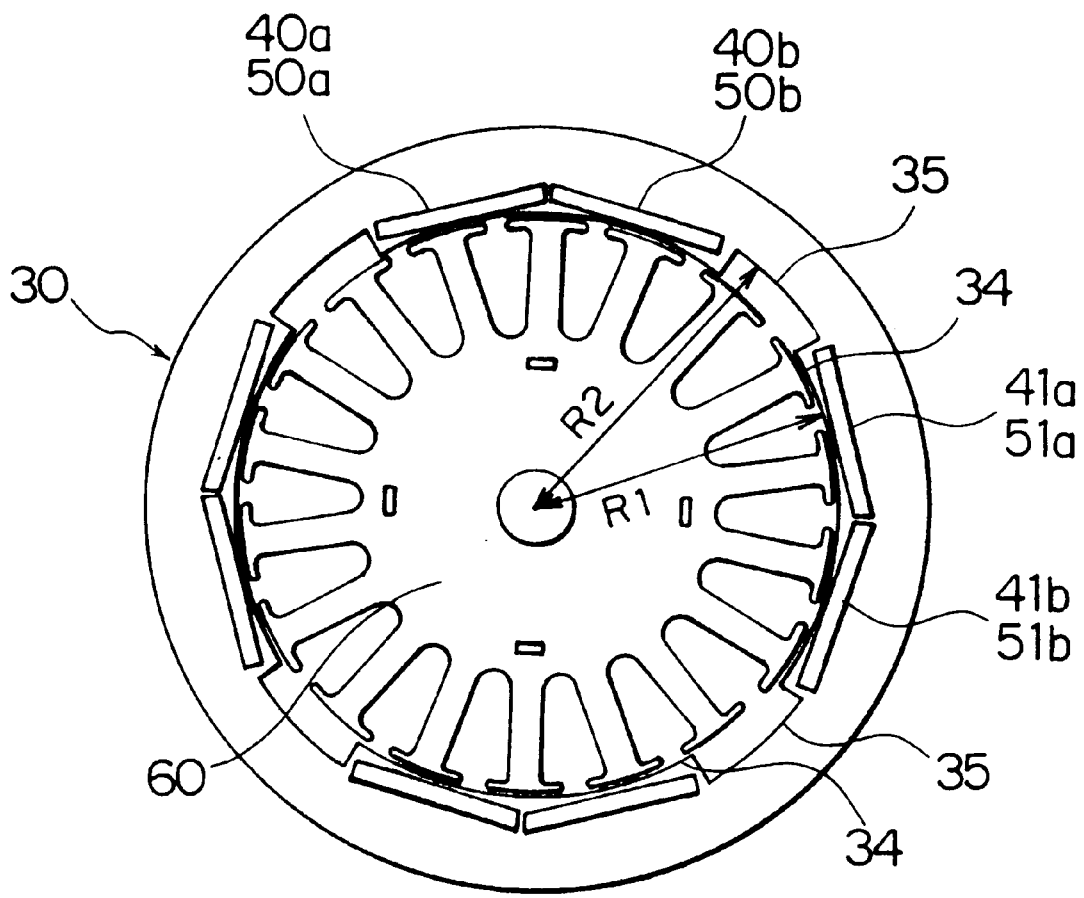
FIG. 6 is a configuration diagram of the magnet motor stator claimed in claim 6 of the present invention.

FIG. 6 is a front view of another magnet motor stator of the present invention. In FIG. 6, 30 is a magnet motor stator formed by laminating steel sheets (silicon steel sheets); and 50a, 50b, 51a, 51b, 52a, 52b, 53a and 53b (some reference numerals omitted) are magnet insertion holes formed in the stator 30.

Also in FIG. 6, 40a and 40b are flat magnets which are of the ferromagnetic type made of a rare-earth substance such as a neodymium magnet or a samarium-cobalt magnet, two magnets forming a magnetic pole. Similarly, magnets 41a, 41b, 42a, 42b, 43a and 43b (some reference numerals omitted) form another three magnetic poles, and a four-pole stator is formed in this embodiment.

This embodiment of the present invention is characterized in that the bore distance R1 from the stator center of the yoke face 34 of the magnet insertion hole portion of the stator is smaller than the bore distance R2 from the stator center of the yoke face 35 of the portion where there is no magnet (between poles).

The magnet motor stator is formed by providing the magnet insertion holes 50a, 50b, 51a, 51b, 52a, 52b, 53a and 53b in the stator, and inserting and holding the flat magnets 40a, 40b, 41a, 41b, 42a, 42b, 43a and 43b into these insertion holes, respectively.

By making the bore distance R1 from the stator center of the yoke face 34 of the magnet insertion hole portion smaller than the bore distance R2 from the stator center of the yoke face 35 of the portion where there is no magnet, the distance between the magnet and the bore of the stator (yoke) becomes larger. It is therefore possible to reduce magnetic flux leaking onto the yoke face 35 of the portion where there is no magnet from the magnet insertion hole end, thus improving the properties of the motor.

Because the magnet is made into a flat shape, a very simple shape, it is easier to prepare than the conventional arcuate magnet, thus reducing the manufacturing cost of the magnet.

Furthermore, this eliminates the necessity of the positioning operation of the magnets upon attaching the magnets to the stator and the bonding operation with an adhesive, and improves the assembly property. Elimination of the need for an adhesive reduces the cost, permitting manufacture of the stator at a lower cost.

Figure 7:
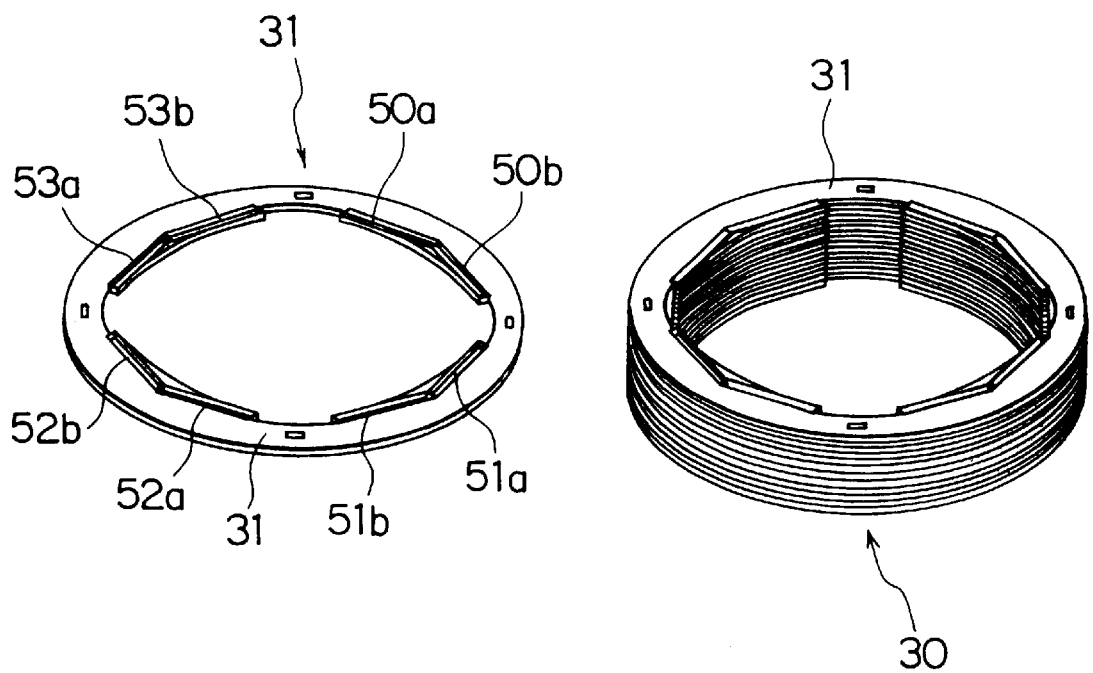
FIG. 7 is a configuration diagram of the magnet motor stator claimed in claim 7 of the present invention.

FIG. 7 is a configuration diagram of another magnet motor stator of the present invention. In FIG. 7, 31 is a stator core plate formed by stamping steel sheets such as silicon steel sheets, and magnet insertion holes 50 (50a, 50b), 51 (51a, 51b), 52 (52a, 52b), and 53 (53a, 53b) are pierced in this stator core plate 31. The magnet motor stator 30 is formed by laminating a plurality of such stator core plates 31.

The stator core plate 31 is manufactured by stamping at the same time as manufacturing a core plate of a rotor similarly by stamping steel sheets such as silicon steel sheets.

The simultaneous manufacture of the stator core plate and the core plate of the rotor improves the operational efficiency and assembly property of the stator, and permits manufacture of the stator at a lower cost than in the conventional art.

FIG. 8 is a configuration diagram of another magnet motor stator of the present invention.

Figure 8A:
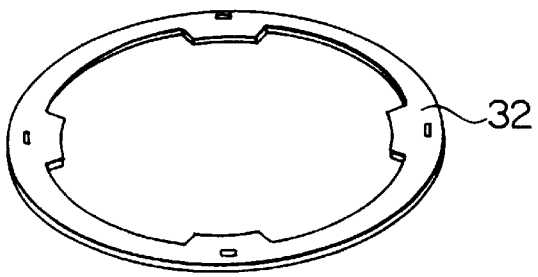
FIG. 8 is a configuration diagram of the magnet motor stator claimed in claims 8 to 10 of the present invention.
Figure 8B:
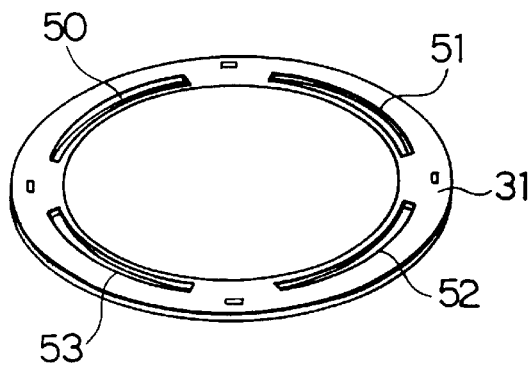
Figure 8C:
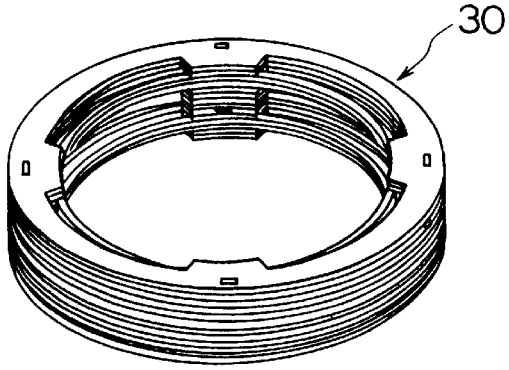

FIG. 8A is a perspective view of a stator core plate not having a magnet insertion hole of the magnet motor; FIG. 8B is a perspective view of the stator core plate having magnet insertion holes; FIG. 8C is a perspective view of the stator formed by laminating a plurality of stator core plates; and FIG. 8D is a perspective view of the stator in a state in which the magnet is inserted into the magnet insertion hole.

The magnet motor stator 30 as shown in FIG. 8C is formed by alternately laminating each a plurality of stator core plates 32 having no magnet insertion hole as shown in FIG. 8A and a plurality of stator core plates 31 having magnet insertion holes 50, 51, 52 and 53 as shown in FIG. 8B.

At this point, the laminating portions of the stator core plates 32 not having a magnetic insertion hole 50, 51, 52 or 53 are arranged at the upper and lower ends of the stator.

Figure 8D:
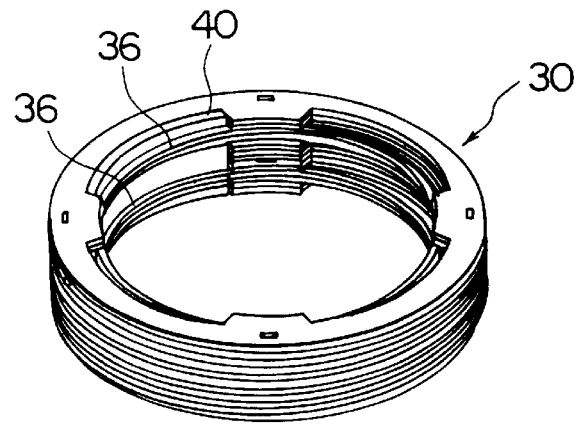

The perspective view in FIG. 8D illustrates a state in which the magnet 40 is inserted into the magnet insertion hole of the stator 30 having a construction as described above. In this drawing, only one inserted magnet is illustrated. While in FIG. 8 a pole is formed by a single magnet to show an example of the shape of the stator 30, a pole may be formed by two flat magnets as shown in FIG. 7 described above.

As a result, the magnet 40 is held only by the portions 36 and 36 formed by laminating a plurality of stator core plates 31 having the magnet insertion holes 50, 51, 52 and 53, and is not held but exposed in the portion formed by laminating the stator core plates 32 not having a magnet insertion hole.

As a magnet allows more effective utilization of magnetic flux in an exposed state leading to direct action without being covered, flux can be effectively utilized with less leakage of magnetic flux in the portion formed by laminating the stator core plates 32 not having a magnet insertion hole, thereby preventing deterioration of the properties of the motor, and an energy-efficient magnet motor stator can be achieved.

Because the portions formed by laminating stator core plates without magnet insertion holes are arranged at the ends (upper and lower surfaces) of the magnet, leakage of magnetic flux at the magnet ends (upper and lower surfaces) can be prevented, thus improving the properties of the motor.

Furthermore, provision of the magnet insertion holes in the stator eliminates the necessity of the positioning operation of the magnets upon attaching the magnets to the stator and the bonding operation with an adhesive. The possibility of fixing the magnet at a plurality of positions improves the assembly property.

FIG. 9 is a configuration diagram of another magnet motor stator of the present invention.

Figure 9A:
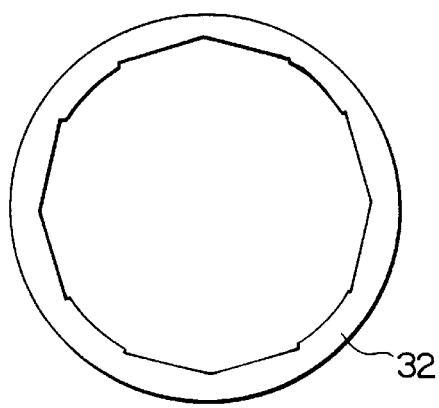
FIG. 9 is a configuration diagram of the magnet motor stator claimed in claims 11 and 12 of the present invention.
Figure 9B:
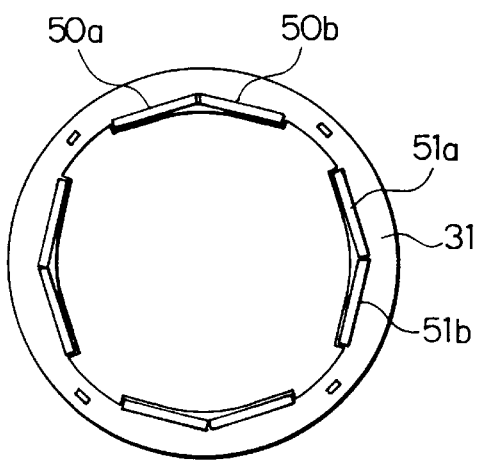
Figure 9C:
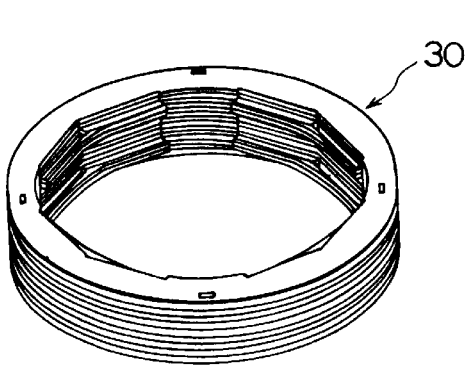

FIG. 9A is a front view of a stator core plate not having a magnet insertion hole of the magnet motor; FIG. 9B is a front view of a stator core plate having magnet insertion holes; FIG. 9C is a perspective view of a stator formed by laminating a plurality of stator core plates; and FIG. 9D is a perspective view of the stator in a state in which the magnet is inserted into the magnet insertion hole.

The magnet motor stator 30 as shown in FIG. 9C is formed by alternately laminating each a plurality of stator core plates 32 having no magnet insertion hole as shown in FIG. 9A and a plurality of stator core plates 31 having magnet insertion holes 50a, 50b, 51a, 51b, 52a, 52b, 53a and 53b (some reference numerals omitted) as shown in FIG. 9B.

At this point, at least one of the upper and lower ends of the stator has the same shape as the stator core plate 32, and is formed by a core plate 31 having a shape with closed magnet insertion holes. In this embodiment, the portion formed by laminating the stator core plates 31 having magnet insertion holes 50 (50a, 50b), 51 (51a, 51b), 52 (52a, 52b), and 53 (53a, 53b) is not arranged at any of the upper and lower ends of the stator, but the stator core plate 32 having no magnet insertion hole is arranged there. However, the sequence of this arrangement is not limited to this one.

Figure 9D:
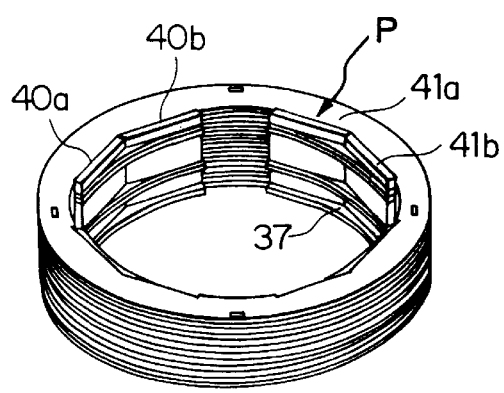

FIG. 9D illustrates a perspective view of a state in which magnets 40a, 40b, 41a and 41b (magnets 42a, 42b, 43a and 43b are not shown) are inserted into the magnet insertion holes of the stator 30 having a construction as described above.

As a result, the magnet is retained within the stator core by means of a core plate with closed insertion holes upon insertion of the magnet, thus improving the assembly property.

At least one of the upper and lower surfaces of the core plate, with the magnet inserted, is deformed toward the bore in the direction of arrow P by caulking or the like to cause the core plate to serve as a stopper in the vertical direction.

As a result, at least one of the uppermost and the lowermost core plates of the magnet can be used as a stopper without using a separate part, thus permitting manufacture of a stator at a lower cost.

The effect of holding the magnet 40 only by the portions 36 (see FIG. 8D) formed by laminating a plurality of stator core plates 31 having magnet insertion holes 50, 51, 52 and 53, and the effect of arranging the portions formed by laminating stator core plates without magnet insertion holes at the ends (upper and lower surfaces) of the magnet have been described above.

Figure 10:
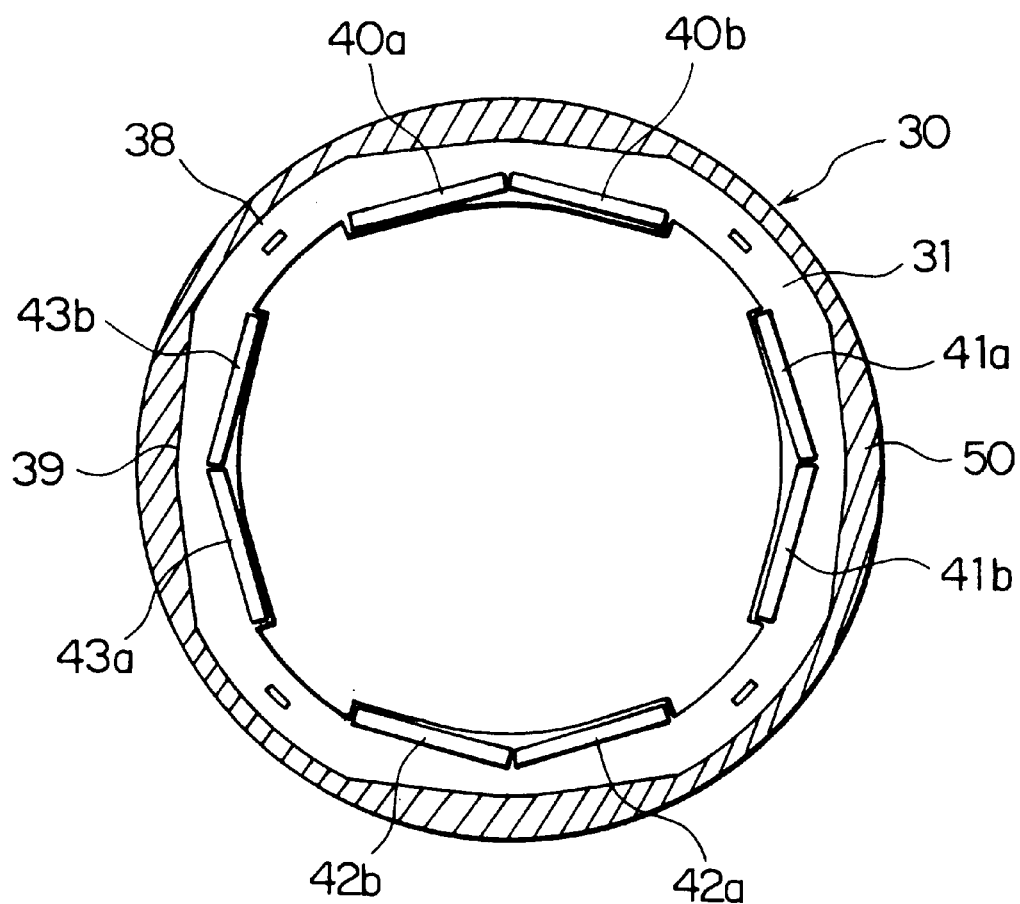
FIG. 10 is a configuration diagram of the magnet motor stator claimed in claim 13 of the present invention.

FIG. 10 is a front view of a magnet motor stator of the present invention.

In FIG. 10, 30 is a magnet motor stator; 31 is a magnet motor stator core formed by laminating steel sheets (silicon steel sheets); and 40a, 40b, 41a, 41b, 42a, 42b, 43a and 43b are flat magnets, inserted and held into magnet insertion holes formed in the stator core 31. The magnet is of the ferromagnetic type made of a rare-earth substance such as a neodymium magnet, two magnets forming a single magnetic pole. A four-pole stator is formed in this embodiment.

The stator core has a portion 38 with a large diameter and a portion 39 with a small diameter, and the stator 30 is formed by pressure-inserting the stator core 31 into the case 50.

In the magnet motor stator of the present invention, shown in FIG. 10 the pressure-inserting portion of the stator core 31 into the case 50 is the portion 39 having the smallest outside diameter of the stator core. In this embodiment, there are four portions with the smallest outside diameter of the stator core, resulting in four pressure-inserting positions of the stator core into the case 50.

In such a construction, the wall thickness of the case 50 can be made thicker than that of the largest outside diameter portion of the stator to ensure a sufficient pressure-inserting strength upon pressure-inserting the stator core 31 into the case 50, thus providing sufficient pressure-inserting strength. Since the largest outside diameter portion 38 is not pressure-inserted into the case, the case may have a smaller thickness, thus permitting the stator 30 as a whole to be made smaller.

FIG. 11 is a configuration diagram of another magnet motor stator of the present invention.

Figure 11A:
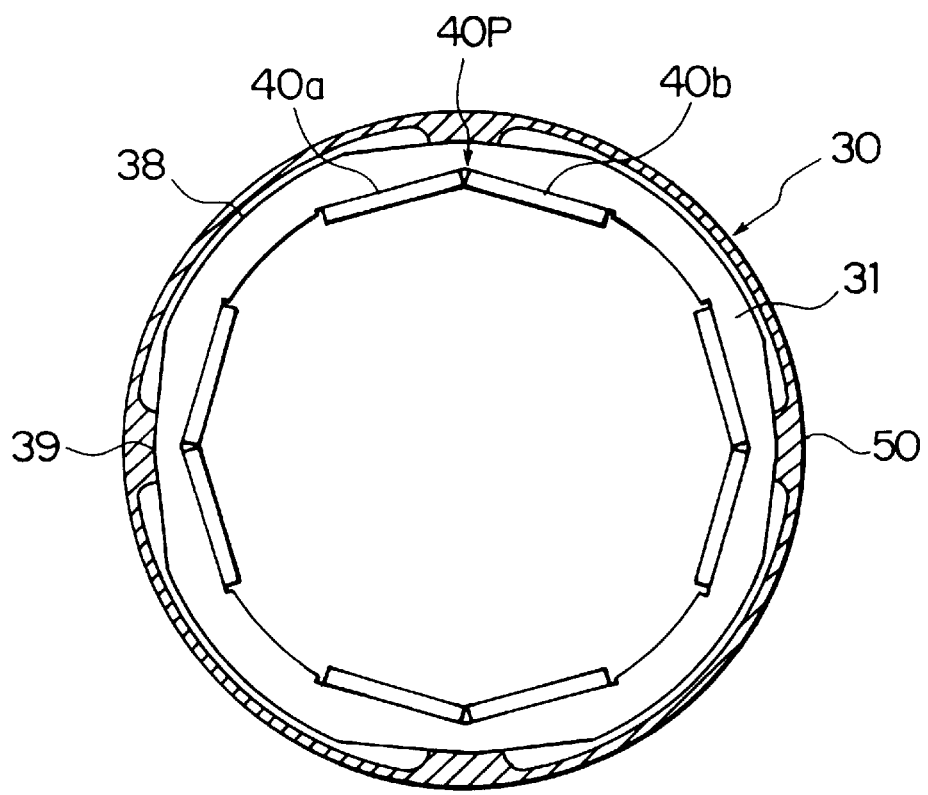
FIG. 11 is a configuration diagram of the magnet motor stator claimed in claim 14 of the present invention.
Figure 11B:
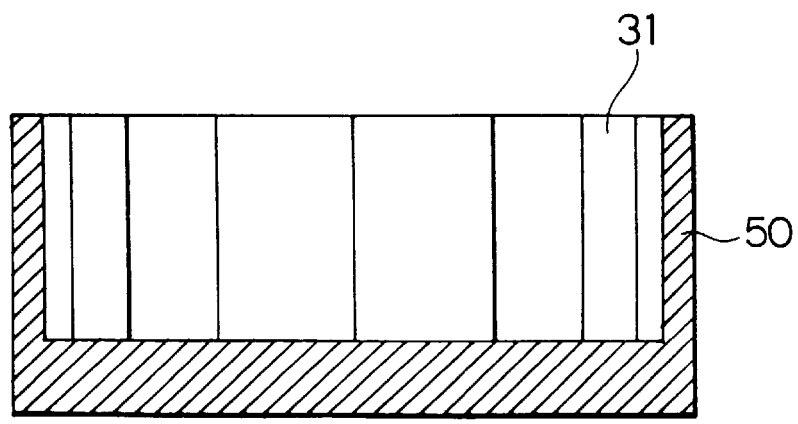

FIG. 11A is a front view of the magnet motor stator; and FIG. 11B is a side view of the stator. In FIG. 11, the same parts as in FIG. 10 have the same reference numerals.

In FIG. 11, 30 is a magnet motor stator; 31 is a magnet motor stator formed by laminating steel sheets (silicon steel sheets); and 40a, 40b, 41a, 41b, 42a, 42b, 43a and 43b (some reference numerals omitted) are flat magnets, and are bonded and held onto the inner surface of the stator core 31.

The magnet is of the ferromagnetic type made of a rare-earth substance such as a neodymium magnet, two magnets forming a single magnetic pole. A four-pole stator is formed in this embodiment.

The stator core has a portion 38 with a large diameter and a portion 39 with a small diameter, and the stator 30 is formed by pressure-inserting the stator core 30 into the case 50.

In this magnet motor stator of, the pressure-inserting portion of the stator core 31 into the case 50 is the portion 39 having the smallest outside diameter of the stator core. A configuration is made such that the pressure-inserting portion into the case forms the center of the magnetic poles formed by the magnets 40a, 40b, 41a, 41b, 42a, 42b, 43a and 43b, i.e., the center point 40P of the magnetic poles 40a and 40b, for example.

In this embodiment, there are four magnetic centers with the smallest outside diameter of the stator core, resulting in four pressure-inserting positions of the stator core 31 into the case 50.

As a result, the magnetic flux of the magnet pole is divided into right and left directions relative to the magnetic pole center, resulting in a lower magnetic flux density at the center portion of the pole. The use of a smaller thickness at the center of the pole of the magnet would therefore not adversely affect the properties of the motor.

A portion of the stator not necessary for the properties of the motor is therefore ground off, and this portion is used as the pressure-inserting portion into the case 50. It is thus possible to downsize the stator 30 and reduce the size of the set as a whole, thus achieving a more compact motor with a lighter weight.

FIG. 12 is a configuration diagram of another magnet motor stator of the present invention.

Figure 12A:
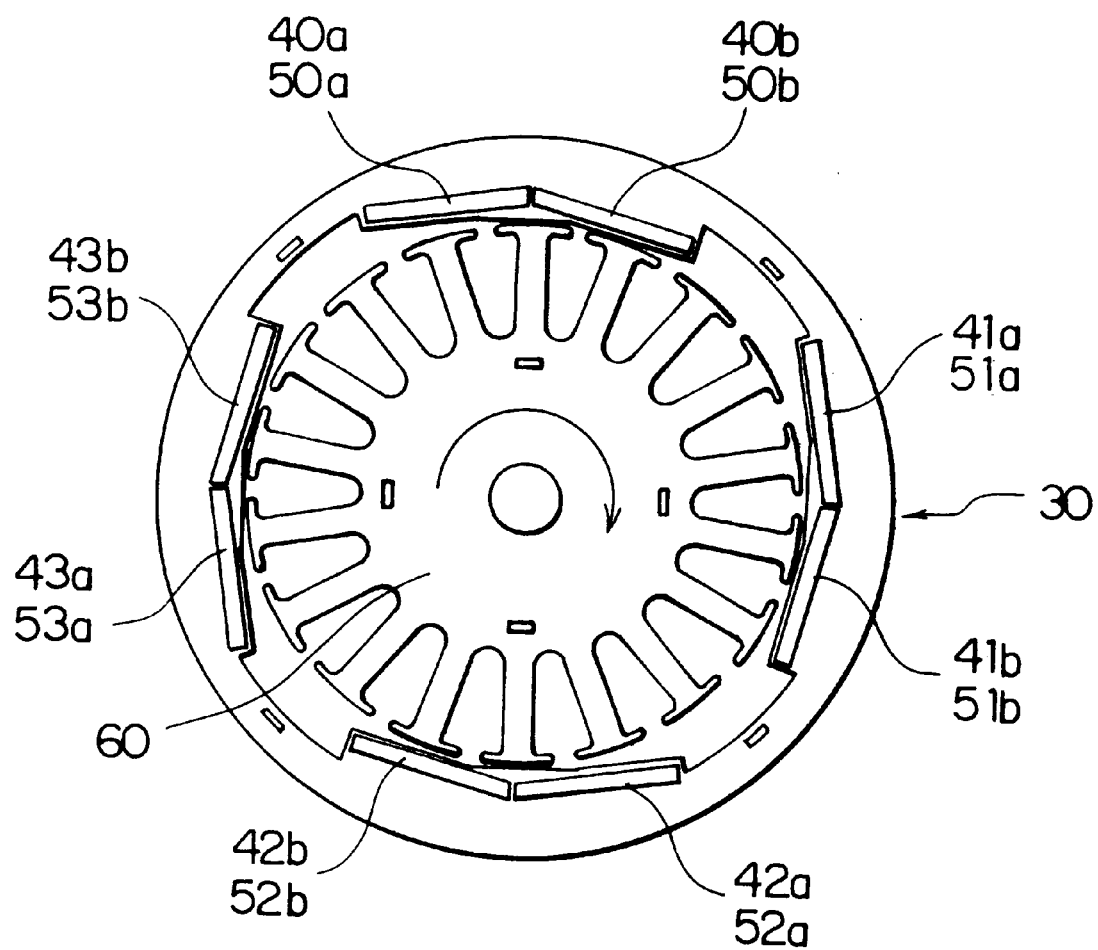
FIG. 12A is a configuration diagram of the magnet motor stator claimed in claim 15 of the present invention.
Figure 12B:
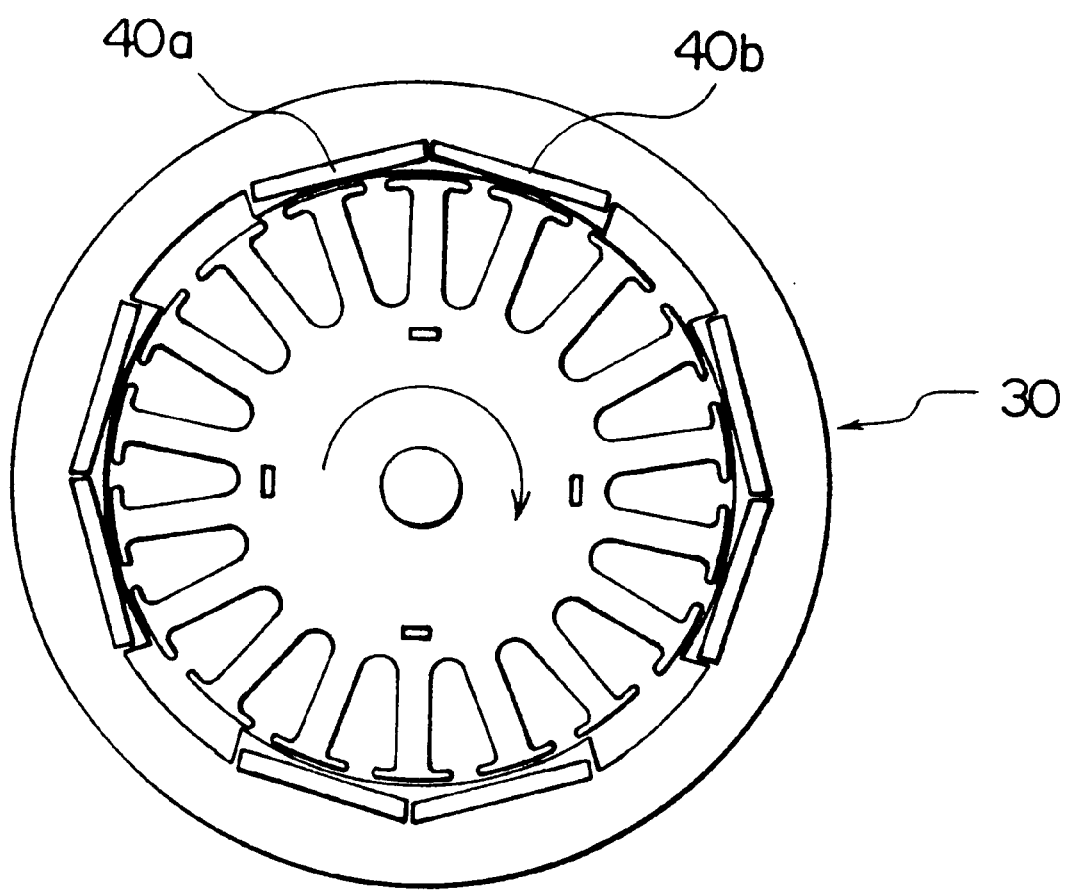
FIG. 12B is a configuration diagram of the conventional magnet motor stator.

FIG. 12A is a front view of the magnet motor stator of the present invention; and FIG. 12B is a front view of the conventional magnet motor stator.

In FIG. 12, 30 is a magnet motor stator formed by laminating steel sheets (silicon steel sheets); and 50a, 50b, 51a, 51b, 52a, 52b, 53a and 53b are magnet insertion holes formed in the stator 30.

Also in FIG. 12, 40a, 40b, 41a, 41b, 42a, 42b, 43a and 43b are flat magnets, and the magnet is of the ferro-magnetic type comprising a rare-earth magnet such as a neodymium magnet, two magnets forming a single magnetic pole. A four-pole stator is formed in this embodiment; and 60 is a rotor.

In the magnet motor shown in FIG. 12B, a set of two magnets forming a magnetic pole of the stator 30, for example, magnets 40a and 40b, are arranged symmetrically relative to the center line of the magnetic pole.

Figure 14:
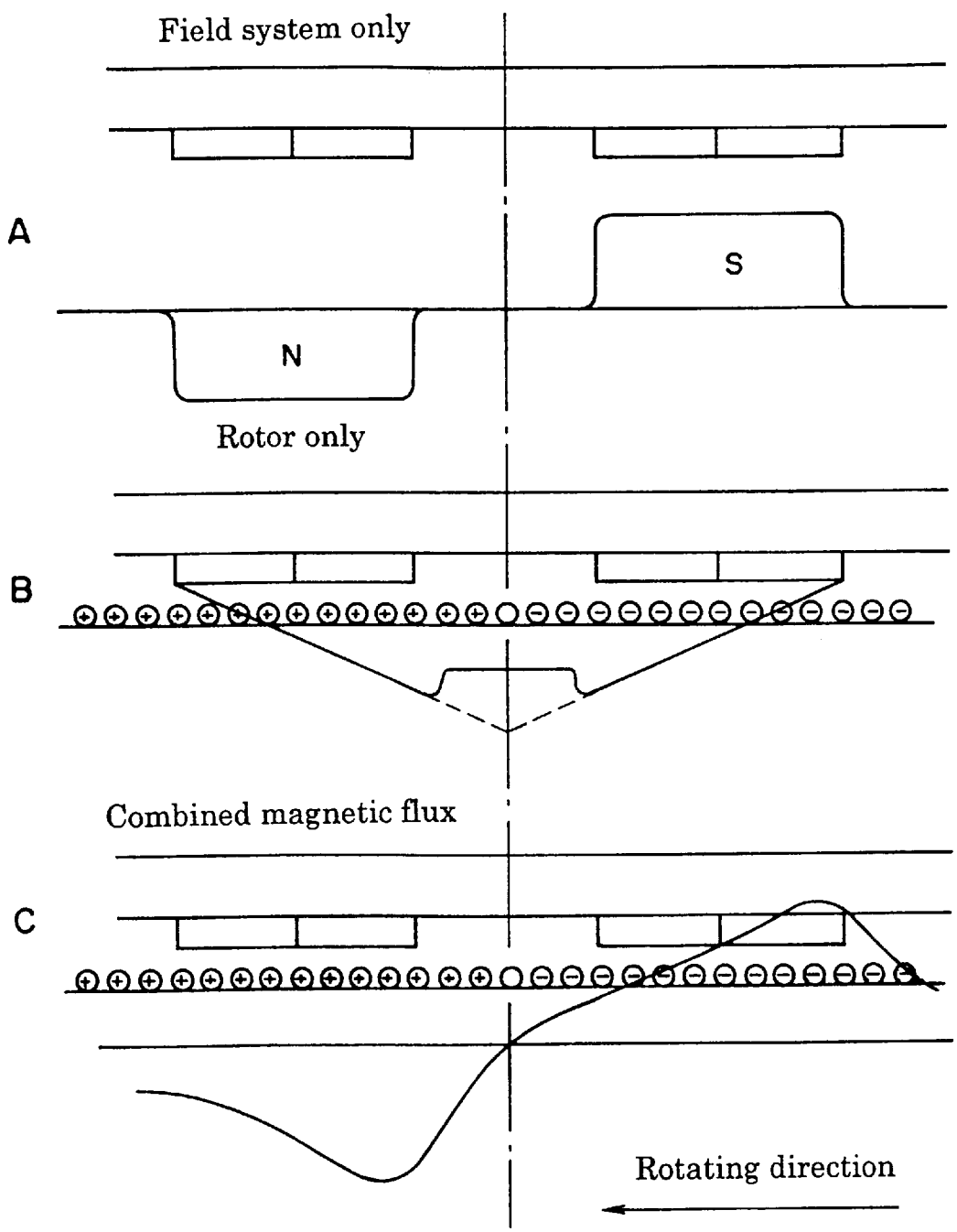
FIG. 14 is a magnetic flux distribution diagram for the conventional magnet arrangement.

FIG. 14 illustrates the magnetic flux distribution between the stator and the rotor in a motor having such a form as described above. FIG. 14A shows the magnetic flux distribution with only a stator magnet in a sectional view of the stator: the distribution is rectangular for both the N-pole and the S-pole. FIG. 14B is the magnetic flux distribution produced by only rotor current. FIG. 14C shows the synthetic magnetic flux distribution obtained by combining both the magnetic fluxes.

The magnetic flux has a very disturbed waveform close to a sine wave; relative to the geometric center axis of magnets for a pole, the magnet located opposite to the rotating direction of the rotor has an increasing magnetic flux. This makes it impossible to use energy effectively, and increases the loss.

Regarding rectification in this type, rectification under a high magnetic flux density brings about a larger energy, and a high rectifying voltage is produced in this part of the coil, causing sparking on the rectifier, and as a result, the service life of the brush is reduced.

A set of two magnets, for example the magnets 40a and 40b forming one magnetic pole of the magnet motor stator 30 of the present invention shown in FIG. 12A, is arranged asymmetrically relative to the center of the magnetic pole. As a result of this configuration, the air gap of the magnet located opposite to the rotating direction of the rotor relative to the geometric neutral axis of the magnets for a pole is increased in size, thus producing a higher magnetic resistance.

Figure 13:
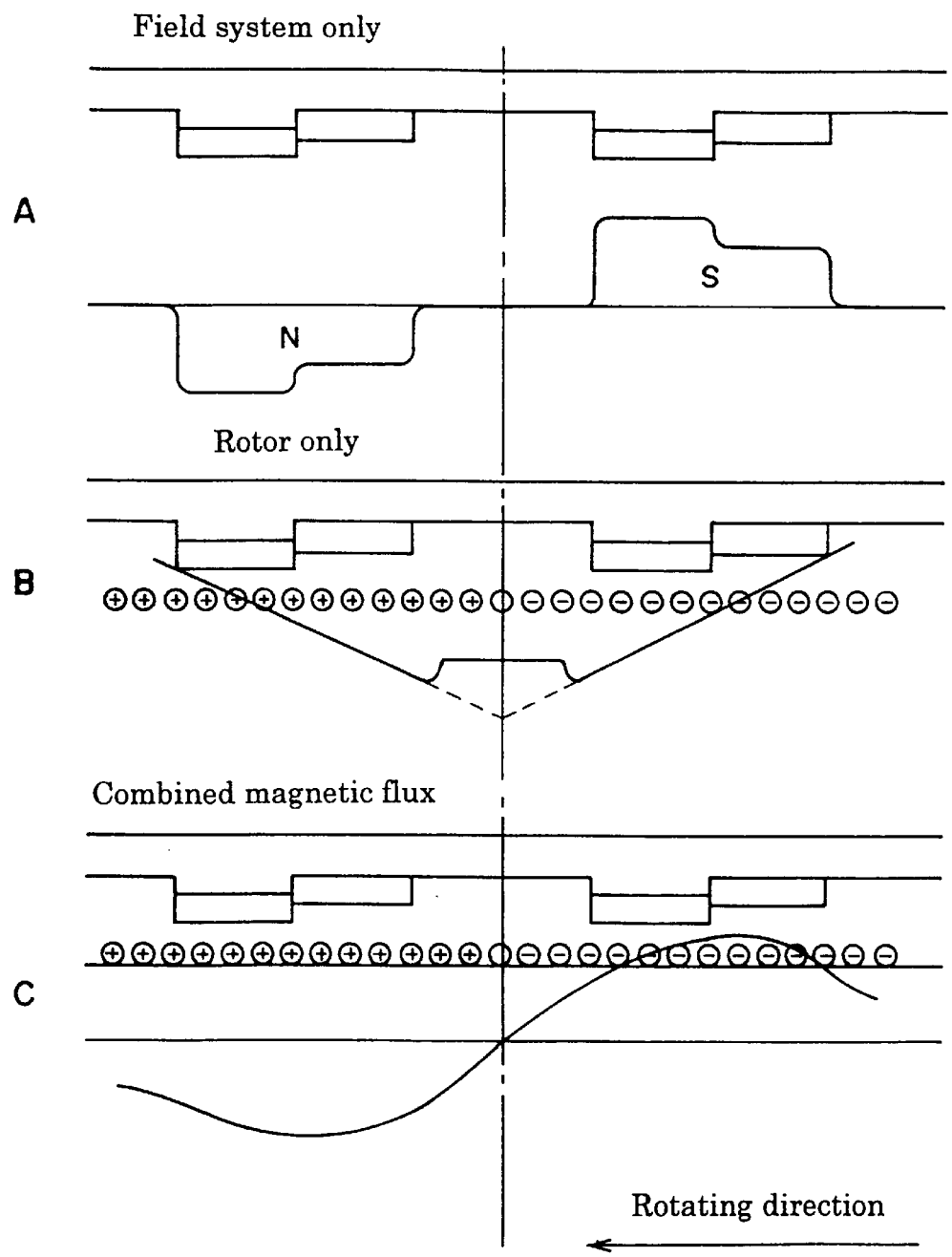
FIG. 13 is a magnetic flux distribution diagram for the magnet arrangement of the present invention claimed in claim 16.

FIG. 13 illustrates the magnetic flux distribution between the stator and the rotor in a motor having such a form. FIG. 13A shows the magnetic flux distribution with only a stator magnet in a sectional view of the stator; the distribution is rectangular for both the N-pole and the S-pole. FIG. 13B is the magnetic flux distribution produced by only rotor current. FIG. 13C shows the synthetic flux distribution obtained by combining both the magnetic fluxes.

The waveform of the magnetic flux thus shows a magnetic flux distribution close to a sine wave. As a result, energy can be effectively utilized and the properties of the motor can be improved.

Regarding rectification in this type, it is possible to prevent rectification at a high magnetic flux density portion, and hence to reduce the rectifying voltage and to extend the service life of the brush.

FIG. 15 is a configuration diagram of another magnet motor stator of the present invention.

Figure 15A:
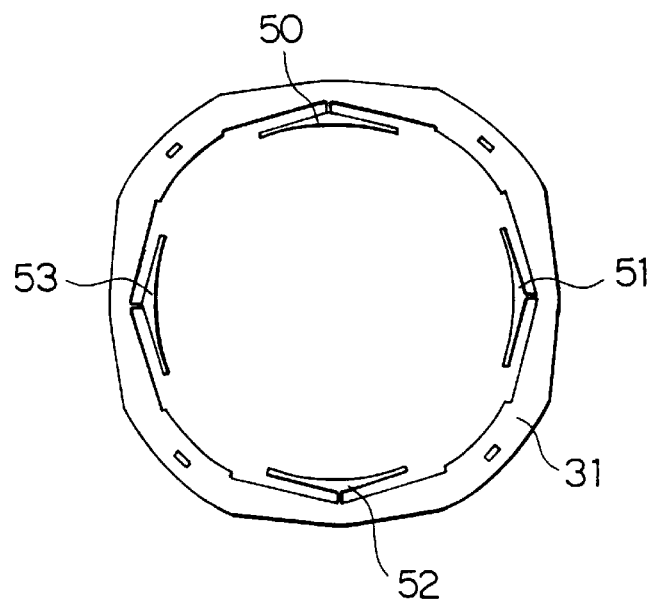
FIG. 15 is a configuration diagram of the magnet motor stator of the present invention claimed in claim 17.
Figure 15B:
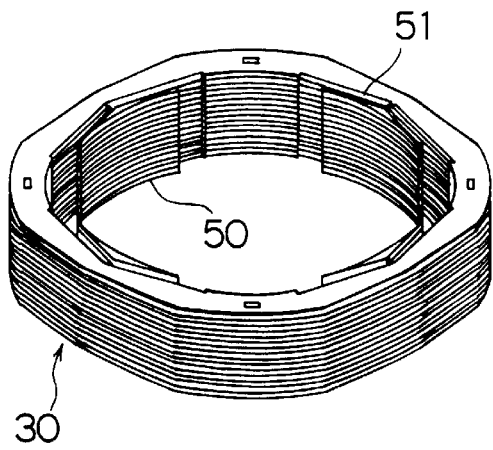
Figure 15C:
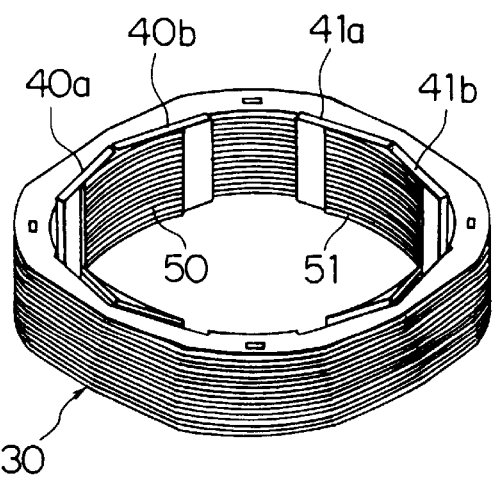
Figure 16:
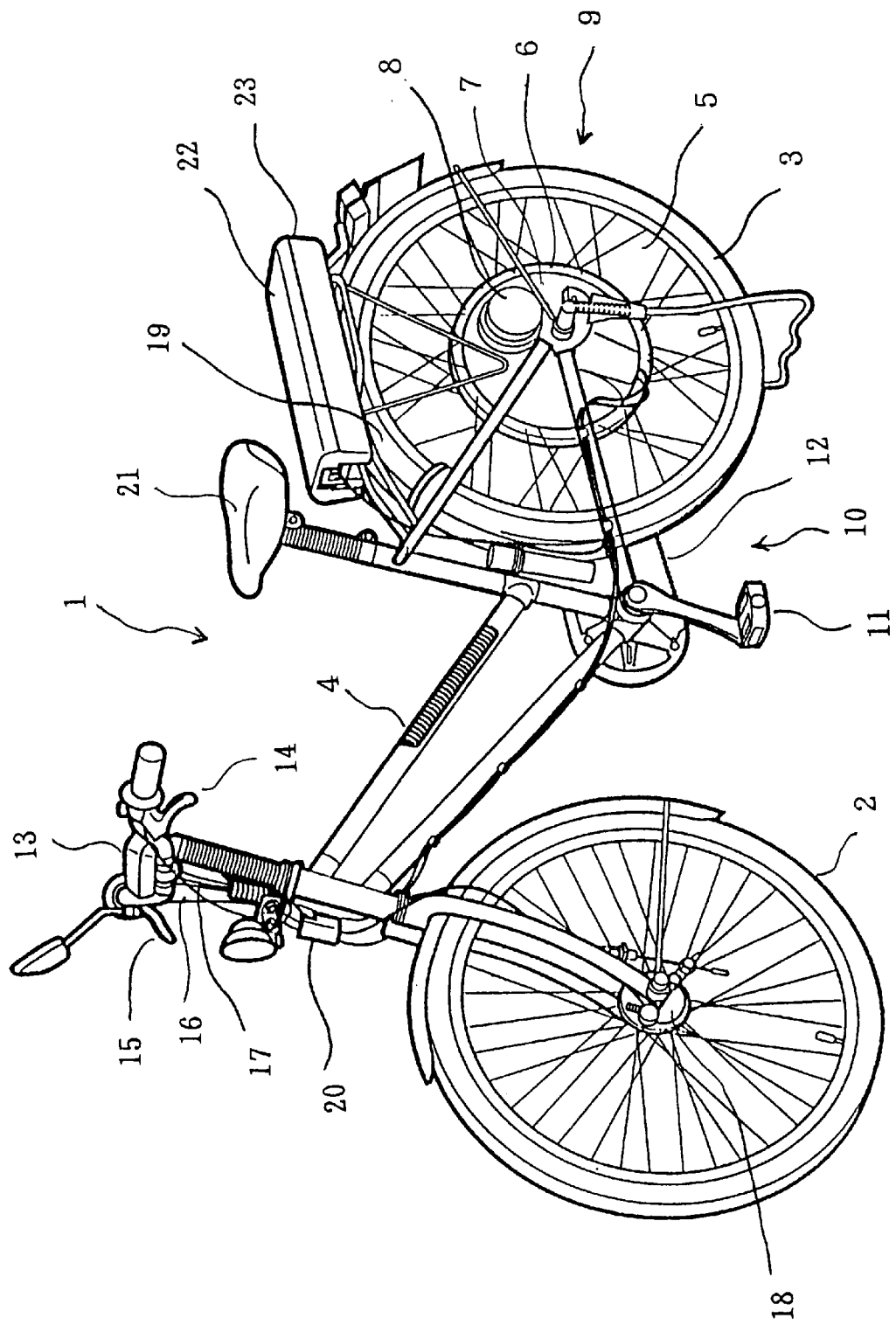
FIG. 16 is a whole perspective view of an electric bicycle.
Figure 17:
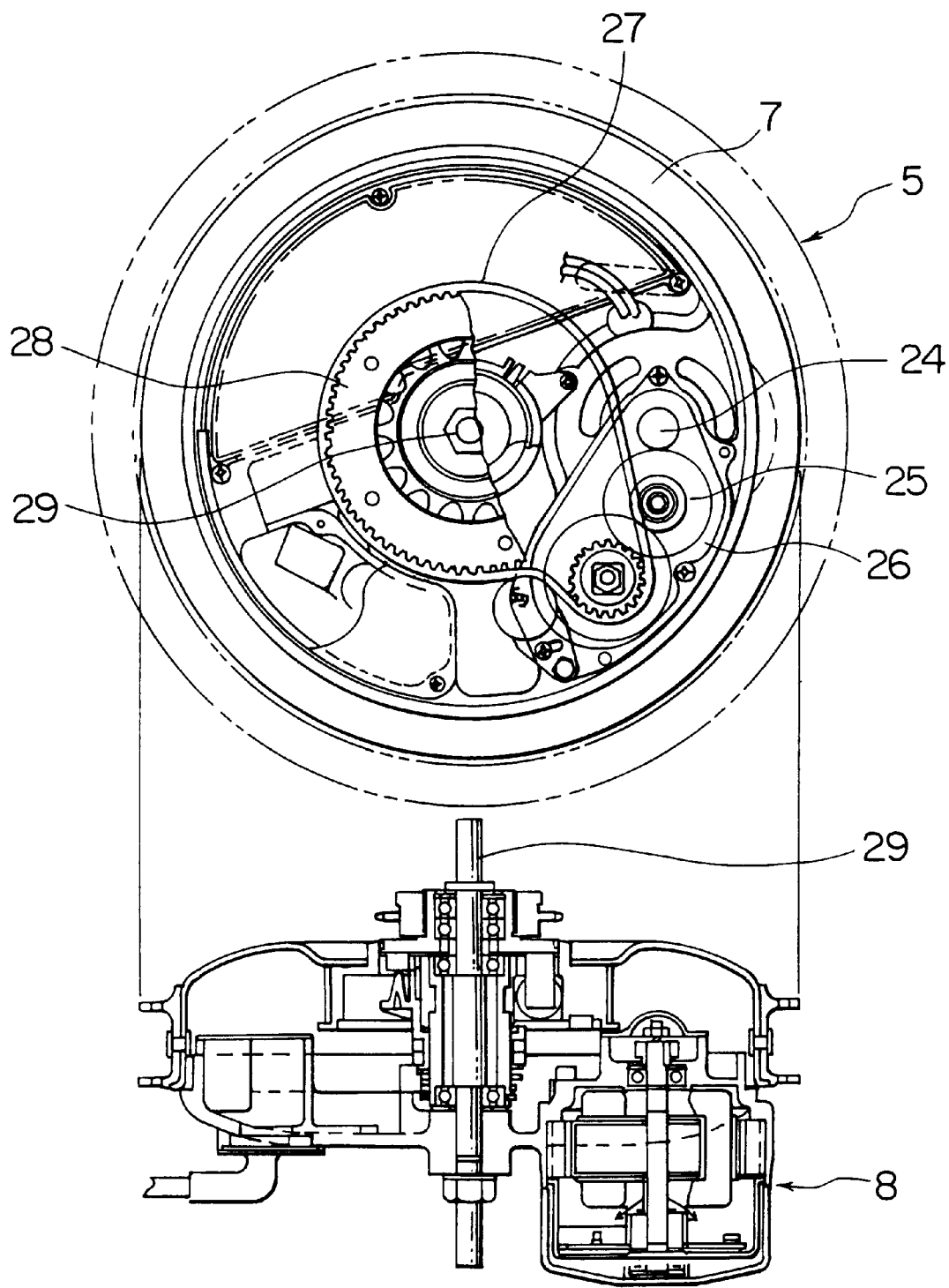
FIG. 17 shows a front view and a side view illustrating a configuration of the disk-shaped casing.
Figure 18:
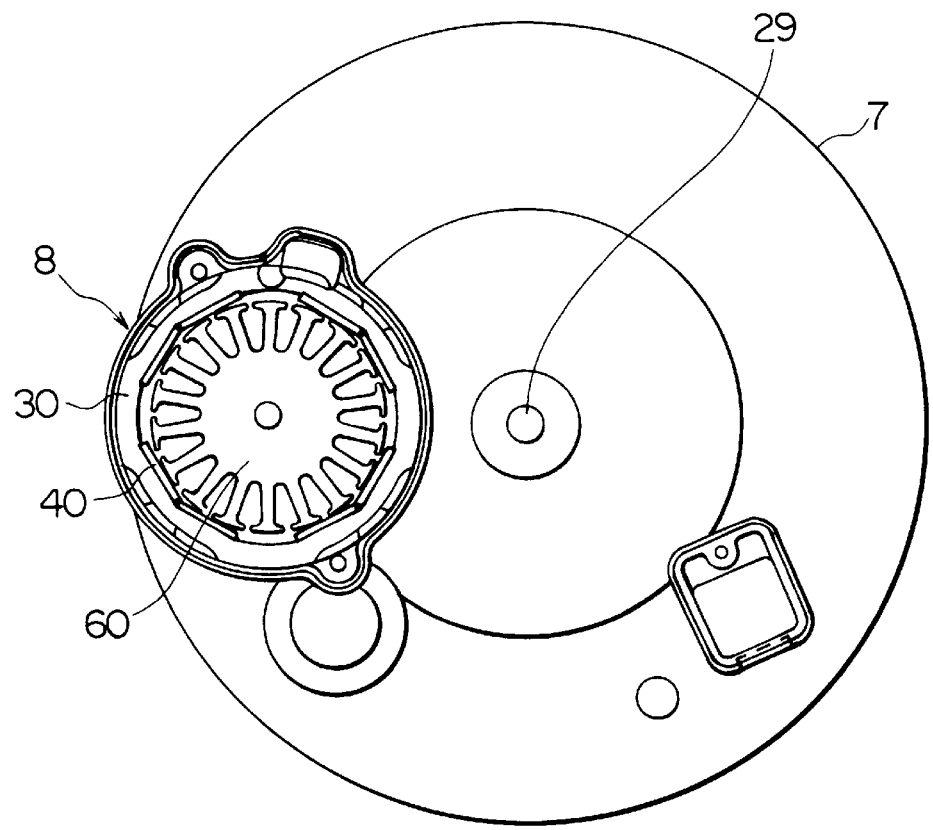
FIG. 18 is a layout diagram of the motor on the disk-shaped casing.
Figure 19:
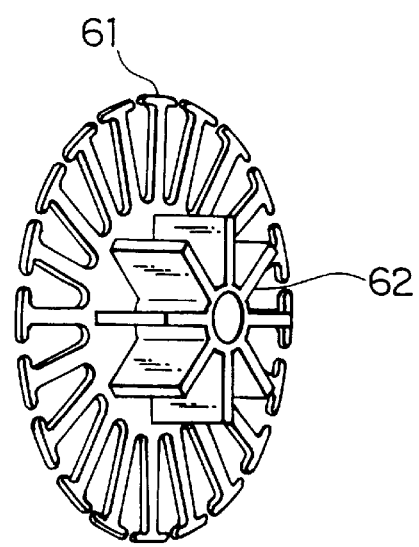
FIG. 19 shows an insulating plate of a rotor of the motor of the present invention.

FIG. 15A is a front view of the magnet motor stator; FIG. 15B is a perspective view of the same; and FIG. 15C is a relational diagram between the magnet insertion hole of the stator and the magnet.

In FIG. 15, 31 is a stator core plate formed by stamping a steel sheet (silicon steel sheet); 30 is a magnet motor stator formed by laminating the stator core plates 31; and 50, 51, 52 and 53 are magnet insertion holders formed in the stator 30.

The magnet insertion holder is formed, after once forming a magnet insertion hole, by cutting the magnet insertion hole at both of the far ends from the two magnet centers.

Also in FIG. 15, 40a, 40b, 41a and 41b are flat magnets. The magnet is of the ferromagnetic type and comprises a rare-earth magnet such as a neodymium magnet, two magnets forming a single magnetic pole. similarly, two other magnetic poles (not shown) form a four-pole stator in this embodiment.

To complete the magnet motor stator 30, therefore, a plurality of stator core plates 31 of FIG. 15A are first laminated to form a stator 30 as shown in FIG. 15B. At this point, the magnets are not as yet inserted into the magnet insertion holders 50, 51, 52 and 53.

Then, the flat magnets 40a, 40b, 41a and 41b are inserted into, and held in, the magnet insertion holders 50, 51, 52 and 53 of the stator 30, whereby the stator 30 is formed as shown in FIG. 15C.

At this point, the magnet insertion holders 50, 51, 52 and 53 are formed by cutting the magnet insertion holes at both ends from the centers of the two magnets. It is thus possible to prevent magnetic flux leakage between the magnet end and the stator core.

The entire disclosure of Japanese Patent Application Nos. 8-101894, 8-101895 and 8-101897 filed on Mar. 31, 1996, including specification, drawings and claims is herein incorporated by reference in their entirety.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A magnet motor stator comprising:
   a plurality of first stator core sheets each having magnet insertion holes passing axially therethrough, and
   a plurality of second stator core sheets each having a plurality of recesses such that each recess corresponds to a respective magnet insertion hole of each of the plurality of first stator core sheets;
   wherein the plurality of first stator core sheets and the plurality of second stator core sheets are laminated such that a magnet will pass through a respective recess of each of the plurality of second stator core sheets and a respective magnet insertion hole of each of the plurality of first stator core sheets.

2. A magnet motor stator according to claim 1, wherein the first stator core sheets each have a recess between each pair of magnet insertion holes along an inner periphery.

3. A magnet motor stator according to claim 1, wherein at least one of the first stator core sheets is laminated to at least one of the plurality of second stator core sheets.

4. A magnet motor stator according to claim 3, wherein at least two of first stator core sheets are laminated together to form a layer and at least two of the second stator core sheets are laminated together to form a layer and wherein said stator includes at least two layers of first stator core sheets and at least two layers of second stator core sheets.

5. The magnet motor stator according to claim 1, wherein said magnet motor stator has one of the second stator core sheets as a top stator core sheet and another of the second stator core sheets as a bottom stator core sheet.

6. The magnet motor stator according to claim 5, wherein at least one of the top stator core sheet or the bottom stator core sheet contact an inserted magnet so as to act as a stop for such magnet in an axial direction.

7. The magnet motor stator according to claim 6, wherein said at least one top stator core sheet or bottom stator core sheet is chaulked to contact an inserted magnet.

8. The magnet motor stator according to claim 1, wherein the stator core sheets are laminated such that at least two of the second stator core sheets are laminated together and at least two of the first stator cores are laminated-together.

9. The magnet motor stator according to claim 8, wherein
   said magnet motor stator includes a plurality of first units and a plurality of second units,
   each first unit includes said at least two laminated first stator core sheets and each second unit includes said at least two laminated second stator core sheets, and
   said magnet motor stator core is formed by alternately laminating one first unit and one second unit.

10. The magnet motor stator according to claim 1, wherein each of the first stator core sheets is a ring.

11. The magnet motor stator according to claim 1, wherein the first stator core sheets have a circular outer periphery and an inner periphery having arcuate sections adjacent to the magnet insertion holes, and wherein the arcuate sections are relatively thicker in a radial direction around a central portion of each of the arcuate sections than at respective end portions thereof.

12. The magnet motor stator according to claim 1, further comprising a plurality of magnets,
   wherein magnet insertion holes of said magnet motor stator are paired together and each holds one magnet, the held magnets forming a pole, the magnets in each respective pole being in close proximity to each other and being arranged asymmetrically with respect to a line extending radially from a center of said magnet motor stator to the center of the pole.

13. The magnet motor stator according to claim 12, wherein there are four poles.

14. The magnet motor stator according to claim 12, wherein
   for each pair of magnets forming the pole, the magnets have near end portions and opposite end portions, and wherein
   a radial distance of the opposite end portion of one of the magnets from the center of said magnet motor stator is greater than a radial distance of the opposite end portion of the other of the magnets from the center of said magnet motor stator.

15. The magnet motor stator according to claim 14, wherein
   the plurality of first stator cores have an inner periphery having arcuate sections adjacent to the magnet insertion holes such that the arcuate sections are relatively thicker in a radial direction at a central portion of each of the arcuate sections than at respective end portions thereof,
   an air gap is provided between each arcuate section and a rotor when rotatably connected to said magnet motor stator,
   a direction in which the rotor turns defines a rotation direction such that the air gap is greater at the opposite end portion of one of the magnets, which opposite end portion is upstream with respect to the near end portions of the magnets in the rotation direction of the rotor.

16. A magnet motor stator comprising:

a stator core having at least four magnet insertion holes passing axially therethrough, wherein the magnet insertion holes are paired together to form poles upon receipt of magnets therein, and whereby the received magnets are arranged asymmetrically with respect to a line extending radially from a center of said magnet motor stator to a center of the pole, and magnets received in each one of the insertion holes, the magnets in each pair of insertion holes having opposite end portions and near end portions at which the magnets are in close proximity to each other.

17. The magnet motor stator according to claim 16, wherein a radial distance of the opposite end portion of one of the magnets from the center of the magnet motor stator is greater than a radial distance of the opposite end portion of the other of the magnets from the center of said magnet motor stator.

18. The magnet motor stator according to claim 17, wherein the plurality of first stator cores have an inner periphery having arcuate sections adjacent to the magnet insertion holes such that the arcuate sections are relatively thicker in a radial direction at a central portion of each of the arcuate sections than at respective end portions thereof, an air gap is provided between each arcuate section and a rotor when rotatably connected to said magnet motor stator, a direction in which the rotor turns defines a rotation direction such that the air gap is greater at the opposite end portion of one of the magnets, which opposite end portion is upstream with respect to the near end portion of the magnets in the rotation direction of the rotor.

19. A magnet motor stator comprising:

a stator core having at least four magnet insertion holes passing axially therethrough, wherein the magnet insertion holes are paired together to form poles upon receipt of a magnet therein, and whereby the received magnets are arranged asymmetrically with respect to a line extending radially from a center of said magnet motor stator to a center of the pole, and magnets received in each one of the insertion holes, the magnets in each pair of insertion holes having opposite end portions and near end portions at which the magnets are in close proximity to each other.

20. The magnet motor stator according to claim 19, wherein a radial distance of the opposite end portion of one of the magnets from the center of the magnet motor stator is greater than a radial distance of the opposite end portion of the other of the magnets from the center of said magnet motor stator.

21. The magnet motor stator according to claim 20, wherein the plurality of first stator cores have an inner periphery having arcuate sections adjacent to the magnet insertion holes such that the arcuate sections are relatively thicker in a radial direction at a central portion of each of the arcuate sections than at respective end portions thereof, an air gap is provided between each arcuate section and a rotor when rotatably connected to said magnet motor stator, a direction in which the rotor turns defines a rotation direction such that the air gap is greater at the opposite end portion of one of the magnets, which opposite end portion is upstream with respect to the near end portion of the magnets in the rotation direction of the rotor.

* * * * *